US008526632B2

(12) United States Patent
Cutler

(10) Patent No.: US 8,526,632 B2
(45) Date of Patent: Sep. 3, 2013

(54) MICROPHONE ARRAY FOR A CAMERA SPEAKERPHONE

(75) Inventor: Ross G. Cutler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1194 days.

(21) Appl. No.: 11/770,713

(22) Filed: Jun. 28, 2007

(65) Prior Publication Data

US 2009/0002476 A1  Jan. 1, 2009

(51) Int. Cl.
*H04R 3/00* (2006.01)

(52) U.S. Cl.
USPC ............. 381/92; 381/94.7; 381/122; 381/93; 348/14.16

(58) Field of Classification Search
USPC ................. 381/26, 66, 91, 92, 111, 122, 336, 381/355, 358, 357, 375, 379, 184, 186, 387, 381/361, 363, 365, 366, 93, 94.1, 94.7, 95, 381/300, 304; 348/211.12, 14.08, 14.09, 348/14.1, 423.1, 14.16, 143–160, 115, 14.01, 348/14.11, 14.12, 14.13
See application file for complete search history.

(56) References Cited

U.S. PATENT DOCUMENTS

| 3,118,340 | A | 1/1964 | Iwerks |
| 4,752,961 | A | 6/1988 | Kahn et al. |
| 4,929,824 | A | 5/1990 | Miyazaki |
| 5,021,818 | A | 6/1991 | Satoh et al. |
| 5,121,426 | A | 6/1992 | Baumhauer, Jr. et al. |
| 5,264,940 | A | 11/1993 | Komiya et al. |
| 5,281,995 | A | 1/1994 | Terashita et al. |
| 5,343,246 | A | 8/1994 | Arai et al. |
| 5,353,058 | A | 10/1994 | Takei |
| 5,686,957 | A | 11/1997 | Baker et al. |
| 5,787,183 | A | 7/1998 | Chu et al. |
| 5,844,599 | A | 12/1998 | Hildin |
| 6,040,860 | A | 3/2000 | Tamura et al. |
| 6,072,522 | A * | 6/2000 | Ippolito et al. ............... 348/14.1 |
| 6,192,196 | B1 | 2/2001 | Keller |
| 6,192,342 | B1 | 2/2001 | Akst |

(Continued)

FOREIGN PATENT DOCUMENTS

| JP | 59-072295 A | 4/1984 |
| JP | 08-125835 | 5/1996 |

(Continued)

OTHER PUBLICATIONS

Asano et al., "Detection and Separation of Speech Event Using Audio and Video Information Fusion and its Application to Robust Speech Interface"; EURASIP Journal on Applied Signal Processing; Feb. 2004; pp. 1727-1738.

(Continued)

*Primary Examiner* — Vivian Chin
*Assistant Examiner* — Leshui Zhang
(74) *Attorney, Agent, or Firm* — Merchant & Gould

(57) ABSTRACT

A camera speakerphone having a microphone array may be used for videoconferencing. Example microphone array designs described herein may be used to perform Sound Source Localization (SSL) and improve audio quality of captured audio. In one example, an omni-directional camera speakerphone includes a base having a speaker and at least one microphone. A neck is coupled to the base which is coupled to a head. The head includes an omni-directional camera and at least one microphone.

20 Claims, 8 Drawing Sheets

(56) References Cited

U.S. PATENT DOCUMENTS

| | | | |
|---|---|---|---|
| 6,211,912 | B1 | 4/2001 | Shahraray |
| 6,275,258 | B1 | 8/2001 | Chim |
| 6,480,300 | B1 | 11/2002 | Aoyama |
| 6,545,699 | B2 | 4/2003 | Satoda |
| 6,600,511 | B1 | 7/2003 | Kaneko et al. |
| 6,757,442 | B1 | 6/2004 | Avinash |
| 6,766,035 | B1 | 7/2004 | Gutta |
| 6,771,819 | B2 | 8/2004 | DeYoung et al. |
| 6,795,106 | B1 | 9/2004 | Cooper |
| 6,844,990 | B2 | 1/2005 | Artonne et al. |
| 6,882,971 | B2 | 4/2005 | Craner |
| 6,934,370 | B1 | 8/2005 | Leban et al. |
| 6,950,141 | B2 | 9/2005 | Mori et al. |
| 7,020,337 | B2 | 3/2006 | Viola et al. |
| 7,031,499 | B2 | 4/2006 | Viola et al. |
| 7,092,002 | B2 | 8/2006 | Ferren et al. |
| 7,099,510 | B2 | 8/2006 | Jones et al. |
| 7,102,669 | B2 | 9/2006 | Skow |
| 7,117,157 | B1 | 10/2006 | Taylor et al. |
| 7,197,186 | B2 | 3/2007 | Jones et al. |
| 7,206,809 | B2 | 4/2007 | Ludwig et al. |
| 7,212,651 | B2 | 5/2007 | Viola et al. |
| 7,305,078 | B2 | 12/2007 | Kardon |
| 7,362,368 | B2 | 4/2008 | Steinberg et al. |
| 7,403,231 | B2 | 7/2008 | Kawanishi |
| 7,430,333 | B2 | 9/2008 | Yu et al. |
| 7,508,413 | B2 | 3/2009 | Nose |
| 7,538,802 | B2 | 5/2009 | Less |
| 7,542,600 | B2 | 6/2009 | Yu et al. |
| 7,742,055 | B2 | 6/2010 | Phelps |
| 7,778,483 | B2 | 8/2010 | Messina et al. |
| 7,782,366 | B2 | 8/2010 | Imai |
| 7,796,831 | B2 | 9/2010 | Tanaka |
| 7,876,367 | B2 | 1/2011 | Muramatsu |
| 7,948,524 | B2 | 5/2011 | Endo et al. |
| 8,465,416 | B2 | 6/2013 | Kitano et al. |
| 2001/0028719 | A1* | 10/2001 | Hayashi ............ 381/92 |
| 2002/0033791 | A1 | 3/2002 | Arakawa |
| 2003/0018475 | A1 | 1/2003 | Basu et al. |
| 2003/0043260 | A1 | 3/2003 | Yap et al. |
| 2003/0185424 | A1 | 10/2003 | Sato et al. |
| 2003/0234772 | A1 | 12/2003 | Zhang et al. |
| 2004/0001137 | A1* | 1/2004 | Cutler et al. ........ 348/14.08 |
| 2004/0008423 | A1 | 1/2004 | Driscoll, Jr. et al. |
| 2004/0021764 | A1 | 2/2004 | Driscoll, Jr. et al. |
| 2004/0032796 | A1* | 2/2004 | Chu et al. ............ 367/123 |
| 2004/0172255 | A1 | 9/2004 | Aoki et al. |
| 2004/0243416 | A1 | 12/2004 | Gardos |
| 2004/0254982 | A1 | 12/2004 | Hoffman et al. |
| 2004/0263636 | A1 | 12/2004 | Cutler et al. |
| 2004/0267521 | A1 | 12/2004 | Cutler et al. |
| 2005/0018828 | A1 | 1/2005 | Nierhaus et al. |
| 2005/0057666 | A1 | 3/2005 | Hu et al. |
| 2005/0178953 | A1 | 8/2005 | Worthington et al. |
| 2005/0276270 | A1 | 12/2005 | Buinevicius et al. |
| 2006/0204023 | A1* | 9/2006 | Stinson et al. ........ 381/122 |
| 2007/0035632 | A1 | 2/2007 | Silvernail et al. |
| 2007/0160357 | A1 | 7/2007 | Lin et al. |
| 2007/0206875 | A1 | 9/2007 | Ida et al. |
| 2007/0266092 | A1 | 11/2007 | Schweitzer |
| 2008/0112598 | A1 | 5/2008 | Gabara |
| 2008/0255840 | A1 | 10/2008 | Cutler |
| 2009/0002477 | A1 | 1/2009 | Cutler |
| 2009/0003678 | A1 | 1/2009 | Cutler |
| 2009/0073275 | A1 | 3/2009 | Awazu |

FOREIGN PATENT DOCUMENTS

| | | |
|---|---|---|
| JP | 10-304329 | 11/1998 |
| JP | 2001-296343 A | 10/2001 |
| JP | 2003-304589 | 10/2003 |
| JP | 2004-032782 A | 1/2004 |
| JP | 2007-005969 | 1/2007 |
| WO | 9847291 A3 | 10/1998 |
| WO | 2005/122632 | 12/2005 |
| WO | WO 2006/030995 | 3/2006 |
| WO | WO 2007/003061 | 1/2007 |
| WO | WO 2009/006004 | 1/2009 |

OTHER PUBLICATIONS

Capin et al., "Camera-Based Virtual Environment Interaction on Mobile Devices"; Lecture Notes in Computer Science, Computer and Information Sciences; ISCIS 2006; 9 pgs.

Chang et al., "Automatic Head-Size Equalization in Panorama Images for Video Conferencing"; Microsoft Research, May 2005; 42 pgs.

Cutler et al., "Distributed Meetings: A Meeting Capture and Broadcasting System"; Month 1-2, 2000; pp. 1-10.

Cutler et al., "Distributed Meetings: A Meeting Capture and Broadcasting System"; Multimedia '02, Dec. 1-6, 2002; pp. 503-512.

Kapralos et al., "Audio-Visual Localization of Multiple Speakers in a Video Teleconferencing Setting"; 2002; 32 pgs.

Lathoud et al., "AV16.3: An Audio-Visual Corpus for Speaker Localization and Tracking"; S. Bengio and H. Bourland (Eds.): MLMI 2004, LNCS 3361; Springer-Verlag Berlin Heidelberg 2005; pp. 182-195.

Microsoft Corporation, "Microsoft Eyes Future of Teleconferencing with RoundTable"; Oct. 26, 2006; 2 pgs.

Nanda et al., "Practical Calibrations for a Real-Time Digital Omnidirectional Camera"; Technical Sketches, Computer Vision and Pattern Recognition, Hawaii, US, Dec. 2001; 4 pgs.

*Updated* Microsoft Announces RoundTable (Formerly RingCam) a 360 Degree "Super Webcam"; posted Jun. 27, 2006 by HSL; 5 pgs.

Yoshimi et al., "A Multimodal Speaker Detection and Tracking System for Teleconferencing"; Dec. 1-6, 2002; Juan-les-Pins France; pp. 427-428.

U.S. Official Action dated Oct. 27, 2010 cited in U.S. Appl. No. 11/735,674.

U.S. Official Action dated Nov. 9, 2010 cited in U.S. Appl. No. 11/771,802.

U.S. Official Action dated Apr. 5, 2011 cited in U.S. Appl. No. 11/735,674.

U.S. Official Action dated May 20, 2011 cited in U.S. Appl. No. 11/771,802.

International Search Report PCT/US2008/067035 mailed Oct. 29, 2008. 10 Pages.

Liu, et al., "FLYSPEC: A Multi-User Video Camera System with Hybrid Human and Automatic Control", Multimedia'02, Dec. 1-6, 2002, Juan-les-Pins, France. pp. 484-492.

Green, et al., "Panocam: Combining Panoramic Video with Acoustic Beamforming for Videoconferencing", published at The Canadian Acoustic Association Conference 2004. Ottawa, Ontario, Canada. Oct. 6-8, 2004. NRC 47171. 3 Pages.

Rui, et al., "Viewing Meetings Captured by an Omni-Directional Camera", vol. No. 3, Issue No. 1. SIGCHI'01, Mar. 31-Apr. 4, 2001, Seattle, WA, USA. pp. 450-457.

U.S. Official Action dated Jun. 6, 2012 cited in U.S. Appl. No. 11/771,786.

U.S. Appl. No. 13/708,093, filed Dec. 7, 2012 entitled "Capture Device Movement Compensation for Speaker Indexing".

Japanese Notice of Rejection dated Aug. 3, 2012 cited in Appln No. 2010-514961.

Japanese Notice of Rejection dated Jan. 25, 2013 cited in Appln No. 2010-514961.

* cited by examiner

MICROPHONE ARRAY FOR A CAMERA SPEAKERPHONE

BACKGROUND

Videoconferencing systems use video cameras and microphone arrays to capture a meeting. The microphone array may be used to determine the location of speakers via Sound Source Localization (SSL). The microphone array may also be used for improving the audio quality (e.g., increasing Signal-to-Noise Ratio (SNR) via beamforming or microphone switching). Microphone arrays in today's videoconferencing systems provide very little information about the range or elevation of the speaker from the microphone array. Also, a microphone array sitting on a conference room table may have poor SSL performance and degraded audio quality due to open notebook computers at the table that occlude the microphones.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to a microphone array for a camera speakerphone. Example microphone array designs described herein may be used in performing Sound Source Localization (SSL) and improving audio quality. In one embodiment, an omni-directional camera speakerphone includes a base coupled to a neck which is coupled to a head. The base and the head each include at least one microphone.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
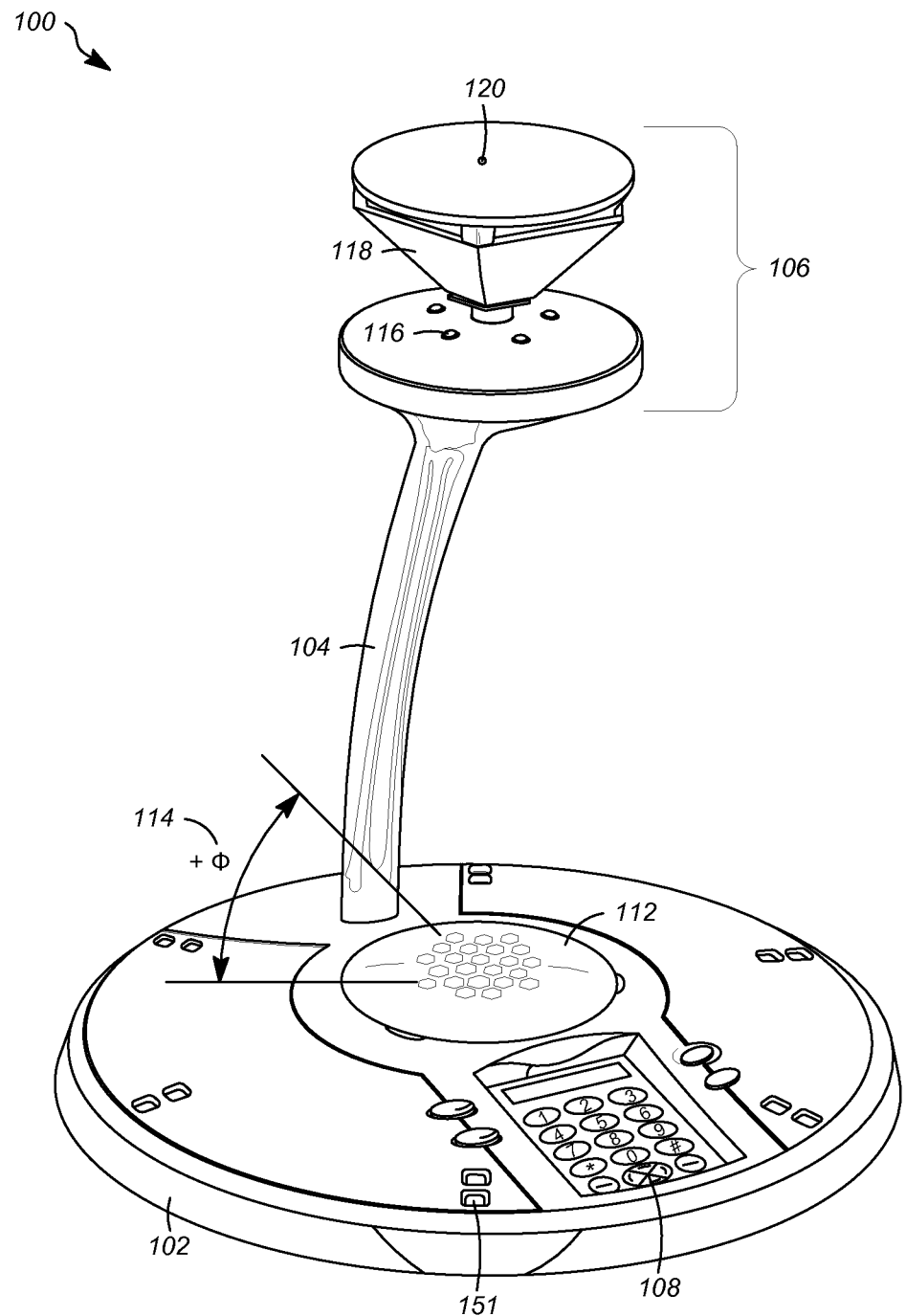
FIG. 1 shows an omni-directional camera speakerphone in accordance with an embodiment of the invention.

FIG. 1 shows an embodiment of a camera speakerphone 100. In one embodiment, camera speakerphone 100 includes a Microsoft® Office Roundtable device. Camera speakerphone 100 includes a base 102 coupled to a neck 104. Neck 104 is coupled to a head 106. As illustrated, neck 104 is a curved neck that includes a bottom portion that is coupled to the base and off a center from the base 102 and a top portion that is coupled to a head 106. The curved neck 104 extending and curving upward from base 102 toward a centerline extending perpendicularly from the center of the base 102. Base 102 may include at least one microphone 151 and head 106 may include at least one microphone 120. Camera speakerphone 100 may be placed on a table and connected to a computing device to capture audio/video for a videoconference. The captured audio/video may be transmitted to meeting remote participants in real time as well as be recorded for viewing at a later time. In one embodiment, camera speakerphone 100 is approximately 30 centimeters in diameter at base 102 and approximately 30 centimeters in height from base 102 to the top of head 106.

Figure 2:
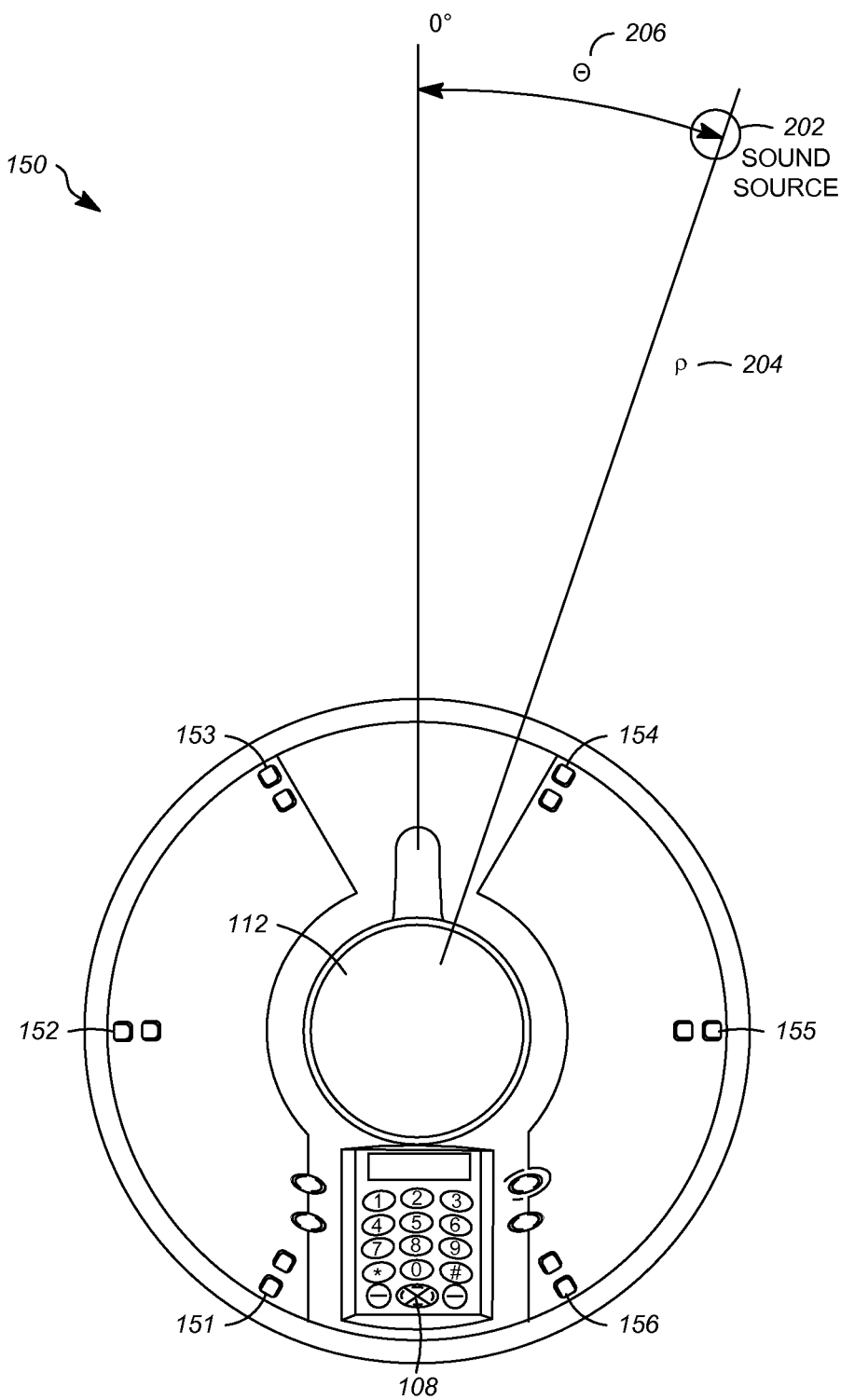
FIG. 2 shows a top view of a base of an omni-directional camera speakerphone in accordance with an embodiment of the invention.

Base 102 includes a speaker 112 and a control pad 108. FIG. 2 shows a top view of base 102 (neck 104 and head 106 are not shown for clarity). Base 102 includes a microphone array 150 having six microphones 151-156 equally spaced on the perimeter of base 102. In one embodiment, each microphone 151-156 includes a super-cardioid microphone. In one embodiment, base 102 has a radius of approximately 150 millimeters (mm) and microphone array 150 has a radius of approximately 130 mm. It will be appreciated that embodiments of base 102 may include alternative shapes and dimensions.

Head 106 may include a camera 116 and at least one microphone 120. FIG. 1 shows head 106 without a cover. In use, head 106 may be surrounded by a cylindrical dust cover. In one embodiment, head 106 includes five cameras that make up an omni-directional camera for generating a panoramic image. In the embodiment of FIG. 1, the lens of camera 116 is pointed upwards and captures images reflected off of reflective surface 118. One skilled in the art having the benefit of this description will appreciate that other camera designs may be used with camera speakerphone 100.

In one embodiment, microphone 120 includes an omni-directional microphone coupled to the top of head 106. Microphone 120 is positioned approximately 30 centimeters above microphone array 150. It will be appreciated that in other embodiments, microphone 120 may be placed in other positions on head 106.

Embodiments of the invention place at least two microphones on different horizontal planes in order to improve SSL and sound quality. Placing at least one microphone in an elevated position from microphone array 150 provides audio information that significantly improves SSL and audio signal processing. Also, having two microphone positions (e.g., base 102 and head 106) that are part of a single camera speakerphone 100 is of great convenience to a user. The user merely has to position and hookup a single device (e.g., camera speakerphone 100) and does not have to worry about placing multiple separate microphone arrays around a conference room. While embodiments herein show one microphone at base 102 and a second microphone at head 106, one skilled in the art having the benefit of this description will appreciate that microphones may be placed at other horizontal planes on camera speakerphone 100. For example, microphones may be placed on base 102 and neck 104 or on neck 104 and head 106. It will also be appreciated that the microphones do have to be placed in similar vertical planes on camera speakerphone 100. For example, microphone 120 does not have to be directly above microphone array 150, but may be offset left or right.

Audio captured by camera speakerphone 100 may be used for Sound Source Localization (SSL). An SSL algorithm may be used to determine elevation 114, range 204, and azimuth 206 from camera speakerphone 100 to a sound source 202 (an example sound source includes a speaker in a meeting). In one embodiment, camera speakerphone 100 may use an SSL algorithm as described in U.S. application Ser. No. 10/446,924, titled "System and Process for Robust Sound Source Localization", filed May 28, 2003, U.S. Pat. No. 6,999,593, to hypothesize azimuth, elevation, and/or range to a sound source.

In another embodiment, microphone 120 may be used to improve audio quality via beamforming and/or microphone selection. Audio captured by camera speakerphone 100 may be processed by a connected computing device. The computing device may determine which microphone(s) provides the best audio quality and then send the selected audio to remote live meeting participants. The selected audio may also be stored on one or more connected storage devices.

Figure 3:
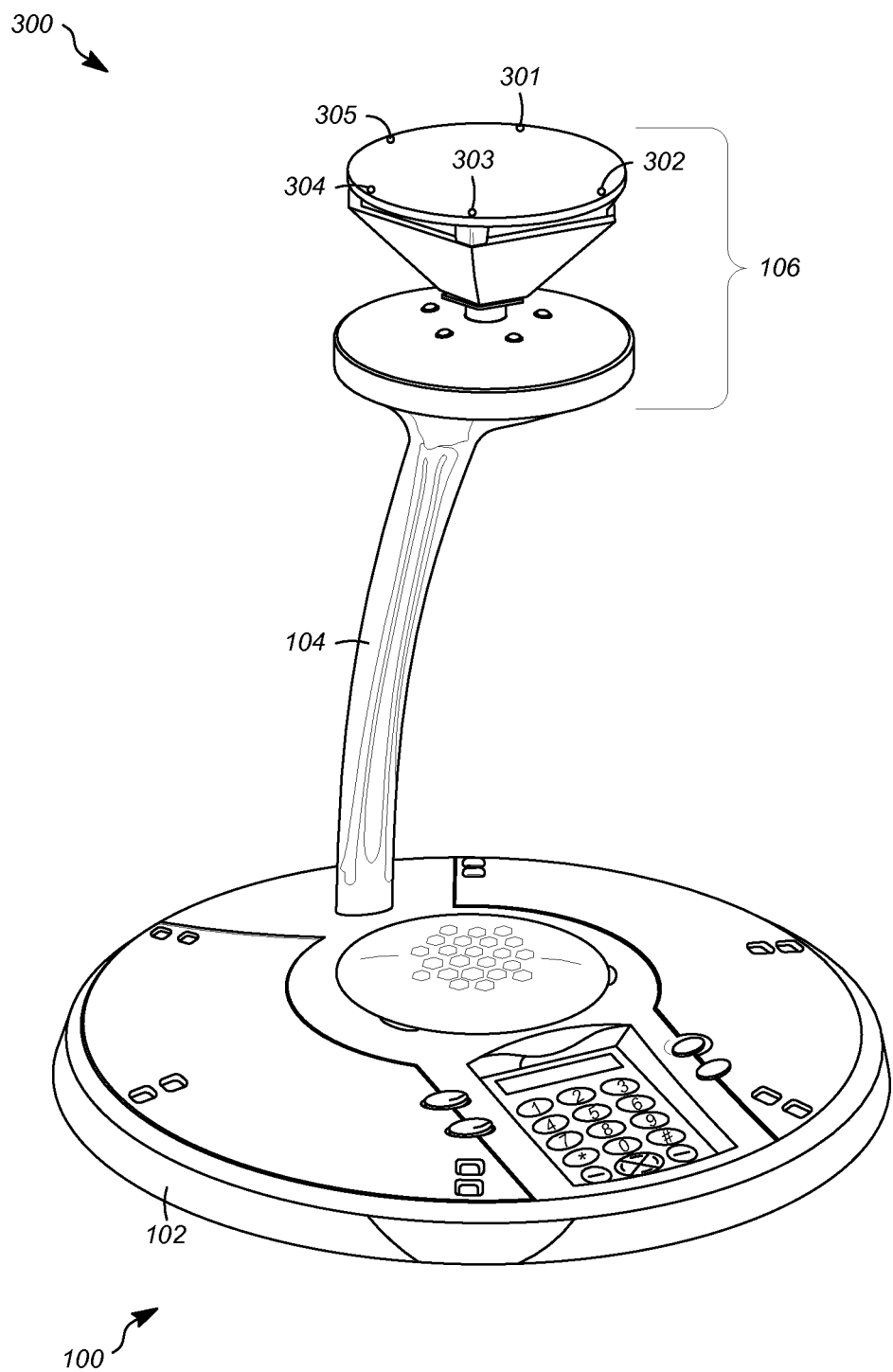
FIG. 3 shows an omni-directional camera speakerphone in accordance with an embodiment of the invention.

Turning to FIG. 3, an embodiment of camera speakerphone 100 is shown. In FIG. 3, head 106 includes a planar microphone array 300 mounted on top of head 106 having five microphones 301-305. The term "planar" refers to the aspect that each microphone 301-305 is positioned in a horizontal plane on top of head 106. Each microphone 301-305 may include an omni-directional microphone or a directional microphone. In other embodiments, microphones 301-305 may include a mix of omni-directional and directional microphones. While FIG. 3 shows microphones 301-305 equally spaced on the perimeter of the top of head 106, other embodiments may include other arrangements of microphones 301-305.

Figure 4:
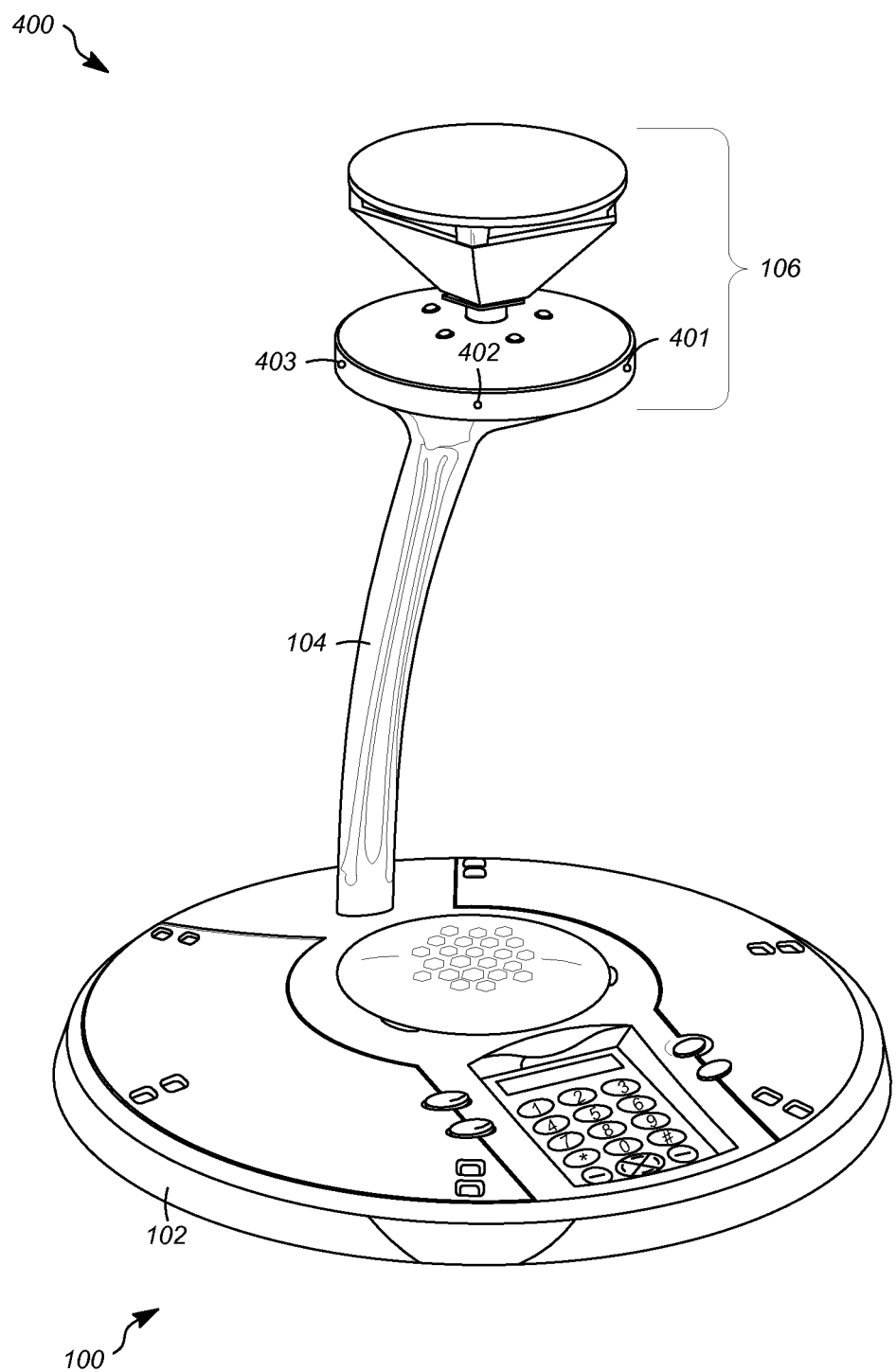
FIG. 4 shows an omni-directional camera speakerphone in accordance with an embodiment of the invention.

Turning to FIG. 4, an embodiment of camera speakerphone 100 is shown. In FIG. 4, head 106 includes a radial microphone array 400 having three microphones 401-403. Radial microphone array 400 may include additional microphones behind head 106 not visible in the view of FIG. 4. Microphones 401-403 spread out radially from a center vertical axis of head 106. In one embodiment, microphones 401-403 are directional microphones directed outward from head 106 since head 106 may act as a sound barrier.

Figure 5:
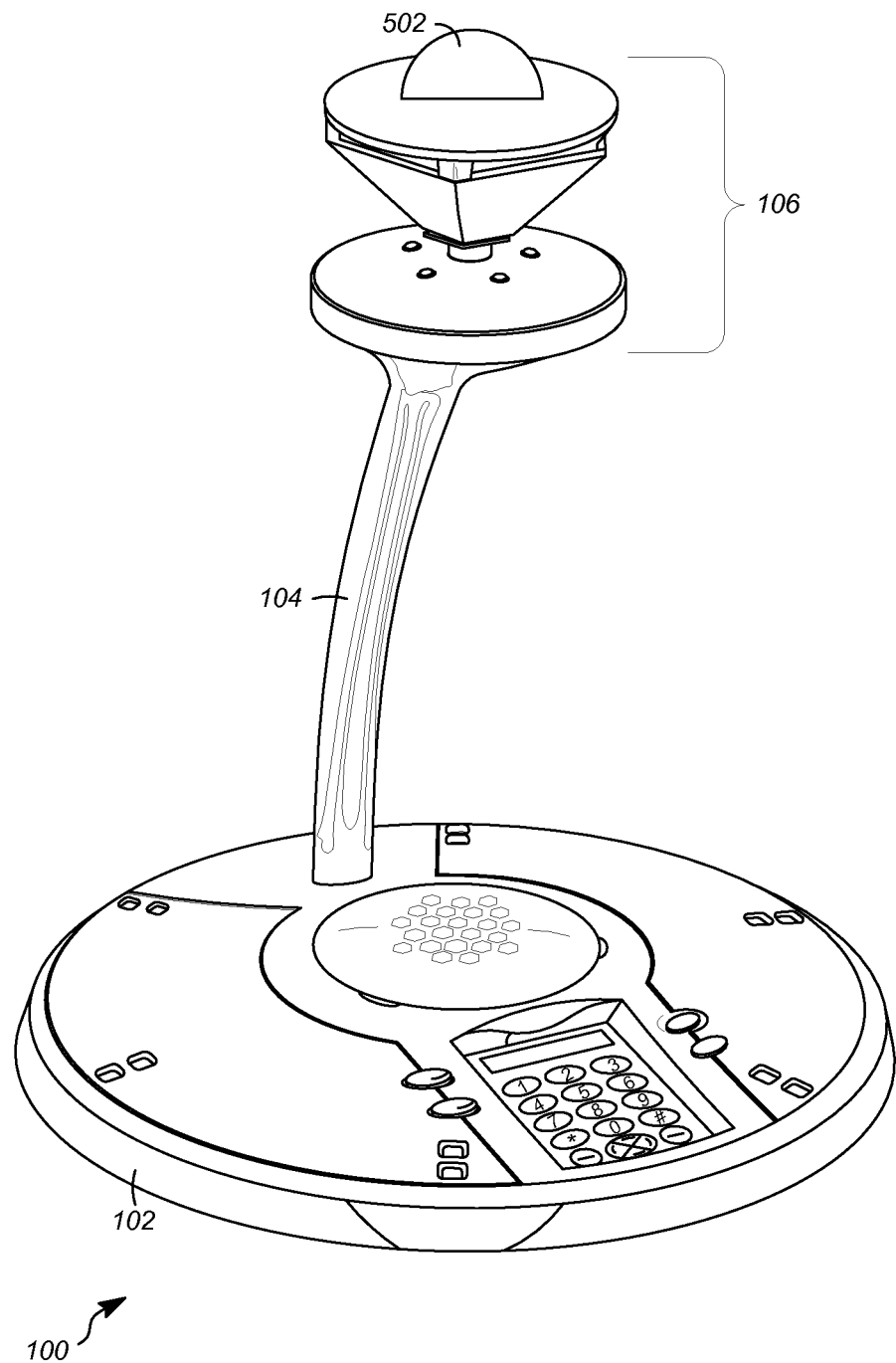
FIG. 5 shows an omni-directional camera speakerphone in accordance with an embodiment of the invention.

Turning to FIG. 5, an embodiment of camera speakerphone 100 is shown. In FIG. 5, a hemispherical microphone array 502 is mounted on top of head 106. In one embodiment, array 502 includes 32 microphones. In other embodiments, hemispherical microphone array 502 may be mounted in other positions on camera speakerphone 100.

Figure 6:
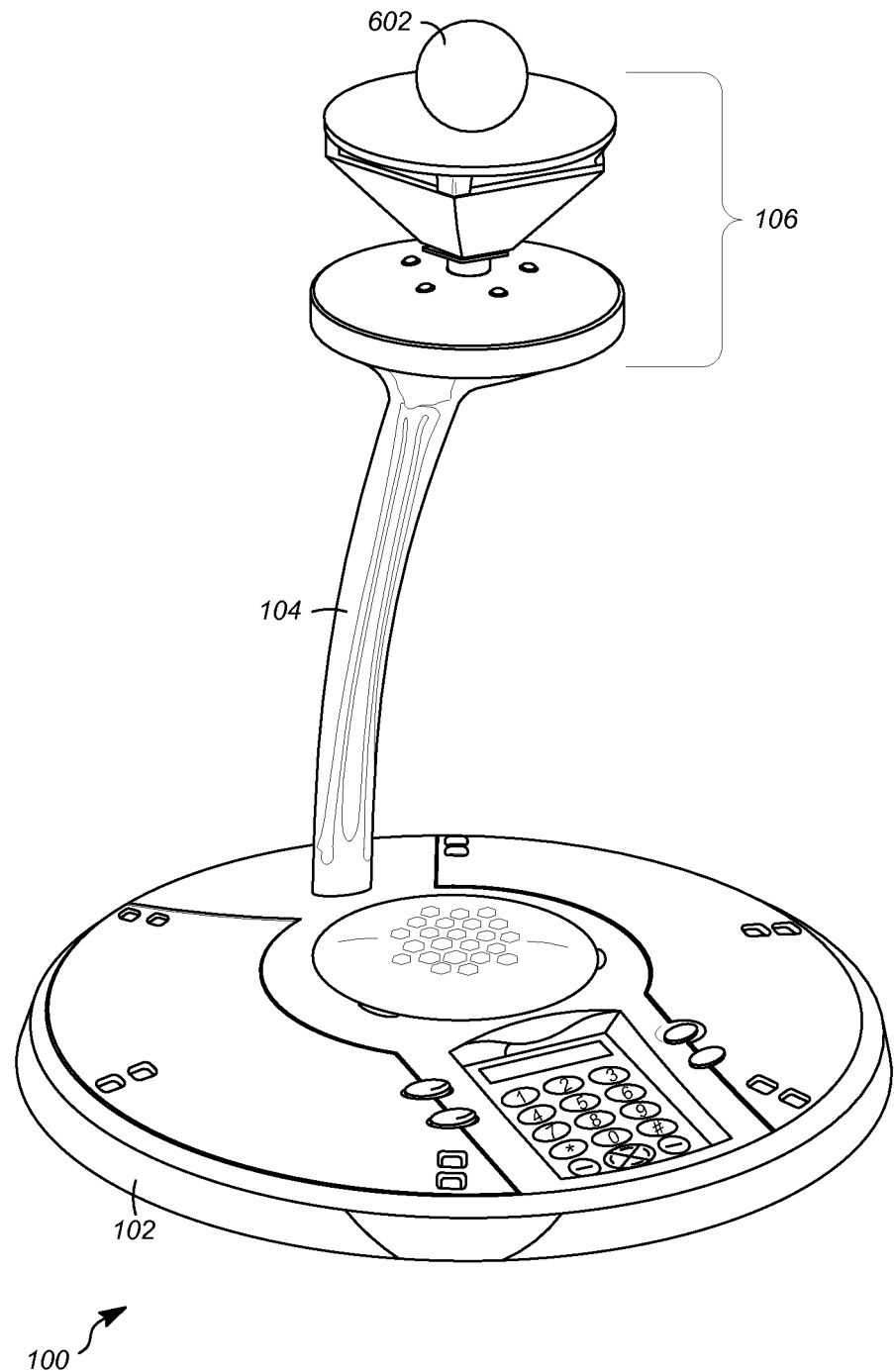
FIG. 6 shows an omni-directional camera speakerphone in accordance with an embodiment of the invention.

Turning to FIG. 6, an embodiment of camera speakerphone 100 is shown. In FIG. 6, a spherical microphone array 602 is mounted on top of head 106. In one embodiment, array 602 includes 64 microphones. In other embodiments, spherical microphone array 602 may be mounted in other positions on camera speakerphone 100.

Figure 7:
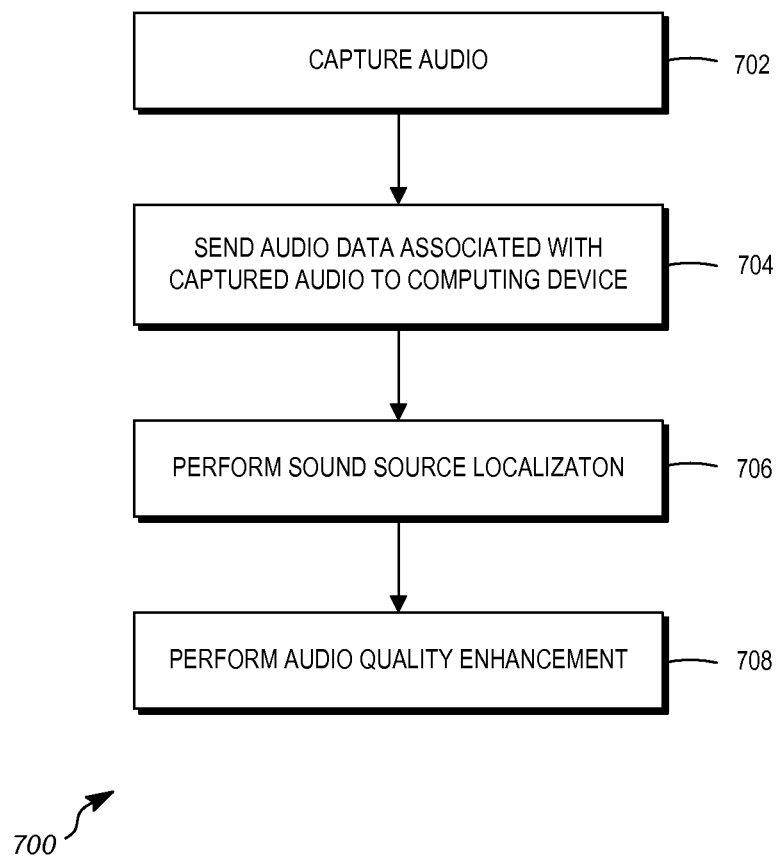
FIG. 7 is a flowchart showing the logic and operations of capturing audio with an omni-directional camera speakerphone in accordance with an embodiment of the invention.

Turning to FIG. 7, a flowchart 700 shows the logic and operations of capturing audio in accordance with an embodiment of the invention. In one embodiment, at least a portion of the logic of flowchart 700 may be implemented by computer readable instructions executable by one or more computing devices.

Starting in block 702, audio is captured by microphones on camera speakerphone 100. Next, in block 704, camera speakerphone 100 converts the audio into associated audio data (i.e., electrical signals) and sends the audio data to a connected computing device. The computing device may be connected via a wired connection or a wireless connection.

Continuing to block 706, the computing device performs SSL using the audio data and outputs sound source information. In one embodiment, not all microphones of camera speakerphone 100 are used for SSL. In one example, one or more microphones on head 106 are used only for SSL. In this example, the SSL only audio is not played for the audio portion of the meeting audio/video. In another example, one or more microphones on base 102 are used only for SSL. In yet another embodiment, which microphones on camera speakerphone 100 are used for SSL is not pre-defined but is determined dynamically when capturing audio.

Next, in block 708, audio quality enhancements are performed using the audio data. These enhancements may include beamforming and/or microphone selection. Microphone selection may include selecting the microphone(s) that provide the maximum SNR. It will be appreciated that beamforming and microphone selection may be adjusted dynamically during a live meeting. For example, different microphones may be selected as different meeting participants at different locations in a room speak. The enhanced audio may then be output. The enhanced audio may be sent to remote meeting participants and/or recorded at the computing device along with video captured by camera speakerphone 100.

Figure 8:
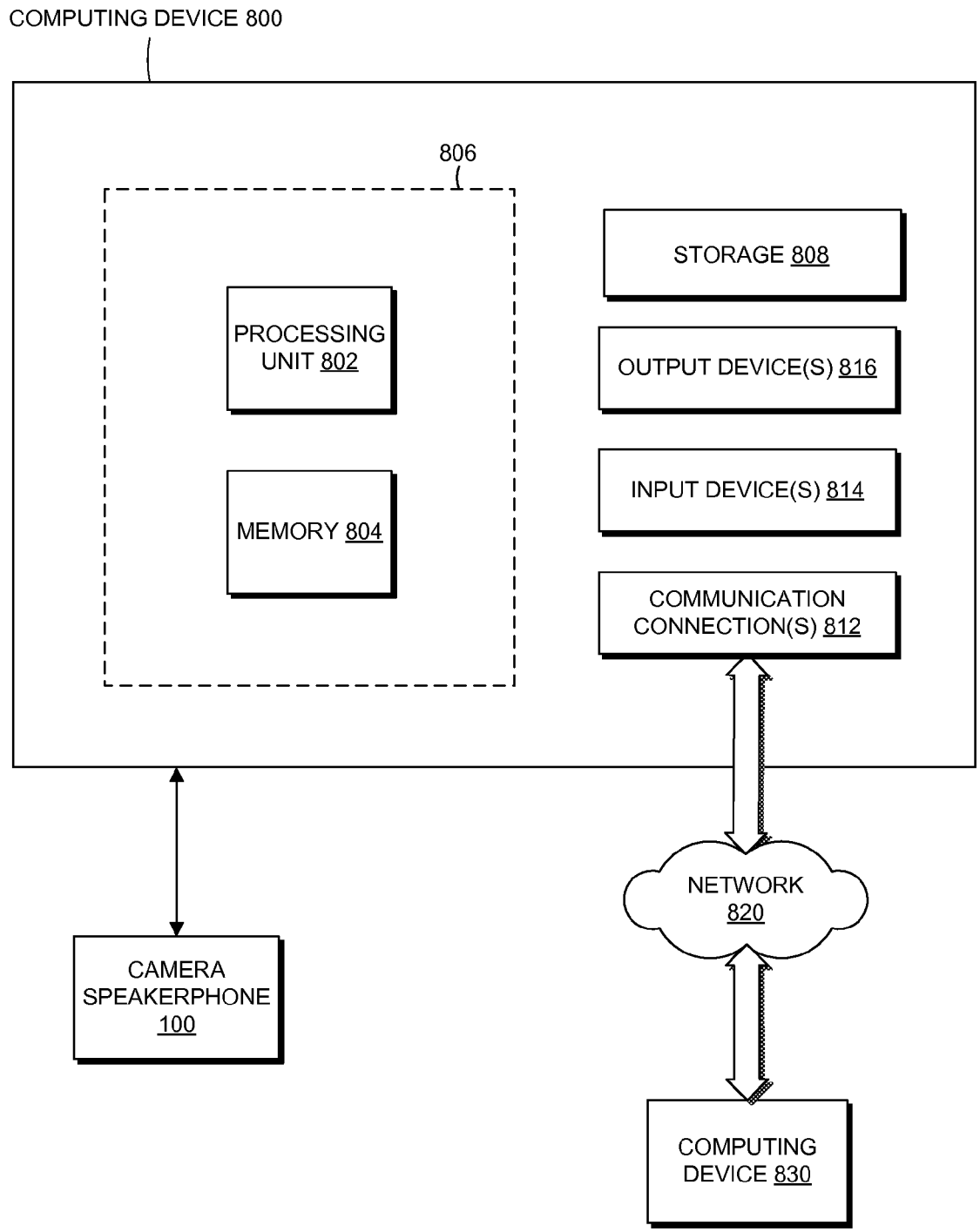
FIG. 8 is a block diagram of an example computing device for implementing embodiments of the invention.

FIG. 8 shows an example of a computing device 800 for implementing one or more embodiments of the invention. The operating environment of FIG. 8 is only one example of a suitable operating environment and is not intended to suggest any limitation as to the scope of use or functionality of the operating environment. Although not required, embodiments of the invention are described in the general context of "computer readable instructions" being executed by one or more computing devices. Computer readable instructions may be distributed via computer readable media (discussed below).

An embodiment of camera speakerphone 100 may be coupled to computing device 800 using a wired connection, wireless connection, or any combination thereof. In one example, SSL and/or audio quality improvement may be performed on audio captured by camera speakerphone 100 by computing device 800. Audio/video captured by camera speakerphone 100 may be stored on computing device 800 and/or sent to computing device 830 for viewing by a meeting remote participant.

In one configuration, computing device 800 includes at least one processing unit 802 and memory 804. Depending on the exact configuration and type of computing device, memory 804 may be volatile (such as RAM), non-volatile (such as ROM, flash memory, etc.) or some combination of the two. This configuration is illustrated in FIG. 8 by dashed line 806.

In other embodiments, device 800 may include additional features and/or functionality. For example, device 800 may also include additional storage (e.g., removable and/or non-removable) including, but not limited to, magnetic storage, optical storage, and the like. Such additional storage is illustrated in FIG. 8 by storage 808. In one embodiment, computer readable instructions to implement embodiments of the invention may be in storage 808. Storage 808 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 804 and storage 808 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 800. Any such computer storage media may be part of device 800.

Device 800 may also include communication connection(s) 812 that allow device 800 to communicate with other devices. Communication connection(s) 812 may include, but is not limited to, a modem, a Network Interface Card (NIC), an integrated network interface, a radio frequency transmitter/receiver, an infrared port, a USB connection, or other interfaces for connecting computing device 800 to other computing devices. Communication connection(s) 812 may include a wired connection or a wireless connection. Communication connection(s) 812 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 800 may include input device(s) 814 such as keyboard, mouse, pen, voice input device, touch input device, infrared cameras, video input devices, and/or any other input device. Output device(s) 816 such as one or more displays, speakers, printers, and/or any other output device may also be included in device 800. Input device(s) 814 and output device(s) 816 may be connected to device 800 via a wired connection, wireless connection, or any combination thereof. In one embodiment, an input device or an output device from another computing device may be used as input device(s) 814 or output device(s) 816 for computing device 800.

Components of computing device 800 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 800 may be interconnected by a network. For example, memory 804 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 830 accessible via network 820 may store computer readable instructions to implement one or more embodiments of the invention. Computing device 800 may access computing device 830 and download a part or all of the computer readable instructions for execution. Alternatively, computing device 800 may download pieces of the computer readable instructions, as needed, or some instructions may be executed at computing device 800 and some at computing device 830. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. An apparatus, comprising:
    a first microphone array in a first horizontal plane comprising more than two microphones equally spaced around a perimeter of a base of the apparatus;
    a curved neck that includes a bottom portion that is coupled to the base and off a center from the base and a top portion that is coupled to a head, wherein the curved neck extends and curves upward from the base toward a centerline extending perpendicularly from the center of the base; and
    a second microphone array in a second horizontal plane that is part of the head, wherein the first horizontal plane is different from the second horizontal plane; and
    a camera included in the head that is pointed upwards and captures images reflected off from a reflective surface on the head and the reflective surface on the head is located above the camera.

2. The apparatus of claim 1 wherein the bottom portion is coupled near an edge of the base.

3. The apparatus of claim 1, wherein the camera comprises five cameras.

4. The apparatus of claim 1, wherein the base includes a speaker.

5. The apparatus of claim 1, wherein the second microphone array includes an omni-directional microphone.

6. The apparatus of claim 1, wherein the second microphone is part of a planar microphone array positioned on the head.

7. The apparatus of claim 1, wherein the second microphone is part of a radial microphone array positioned on the head.

8. The apparatus of claim 1, wherein the second microphone is part of a hemispherical microphone array positioned on the head.

9. The apparatus of claim 1, wherein the second microphone is part of a spherical microphone array positioned on the head.

10. An omni-directional camera speakerphone, comprising:
   a base including a speaker and at least one microphone array having microphones equally positioned around the base;
   a neck that includes a bottom portion that is coupled to the base and off a center from the base and a top portion that is coupled to a head, wherein the neck extends and curves upward from the base toward a centerline extending perpendicularly from the center of the base;
   the head coupled to the neck, the head including at least one microphone at the head and a camera that is pointed upwards and captures images reflected off of from a reflective surface on the head and the reflective surface on the head is located above the camera.

11. The omni-directional camera speakerphone of claim 10 wherein the at least one microphone at the head includes an omni-directional microphone.

12. The omni-directional camera speakerphone of claim 10 wherein the at least one microphone at the head includes a planar microphone array.

13. The omni-directional camera speakerphone of claim 10 wherein the at least one microphone at the head includes a radial microphone array.

14. The omni-directional camera speakerphone of claim 10 wherein the at least one microphone at the head includes a hemispherical microphone array.

15. The omni-directional camera speakerphone of claim 10 wherein the at least one microphone at the head includes a spherical microphone array.

16. The omni-directional camera speakerphone of claim 10 wherein the at least one microphone at the base and the at least one microphone at the head to capture audio for use in sound source localization.

17. The omni-directional camera speakerphone of claim 10 wherein the at least one microphone at the head to capture audio for use in sound source localization only.

18. A system, comprising:
   an omni-directional camera speakerphone, comprising:
      a base including a speaker and at least one microphone array having microphones equally positioned around the base;
      a neck that includes a bottom portion that is coupled to the base and off a center from the base and a top portion that is coupled to a head, wherein the neck extends and curves upward from the base toward a centerline extending perpendicularly from the center of the base;
   the head coupled to the neck, the head including a camera that is pointed upwards and captures images reflected off from a reflective surface on the head and the reflective surface on the head is located above the camera; and
   a computing device coupled to the omni-directional camera speakerphone, the computing device having stored computer readable instructions that when executed perform operations comprising:
      receiving audio data at the computing device associated with audio captured by the omni-directional camera speakerphone; and
      performing sound source localization using the audio data.

19. The system of claim 18 wherein a portion of the audio data is used for sound source localization only.

20. The system of claim 18 wherein the computer readable instructions when executed further perform operations comprising:
   performing audio quality enhancement using the audio data.

* * * * *